United States Patent [19]

Yamano et al.

[11] Patent Number: 5,380,064
[45] Date of Patent: Jan. 10, 1995

[54] ROTATABLE SEAT

[75] Inventors: Eiichi Yamano; Toru Kondo; Masami Yonekura, all of Ayase, Japan

[73] Assignee: Ikeda Bussan Co., Ltd., Ayase, Japan

[21] Appl. No.: 158,202

[22] Filed: Nov. 29, 1993

[30] Foreign Application Priority Data

Nov. 30, 1992 [JP] Japan ................................ 4-340953

[51] Int. Cl.$^6$ .............................................. A47C 3/18
[52] U.S. Cl. ......................... 297/344.22; 297/344.21; 248/415
[58] Field of Search .................. 297/344.21, 344.22, 297/344.23, 344.26; 248/349, 415

[56] References Cited

U.S. PATENT DOCUMENTS

| | | | |
|---|---|---|---|
| 4,226,398 | 10/1980 | Freber | 297/344.21 X |
| 5,000,513 | 3/1991 | Schmidt | 248/349 X |

FOREIGN PATENT DOCUMENTS

| | | |
|---|---|---|
| 2501151 | 7/1976 | Germany . |
| 4203150 | 8/1993 | Germany . |
| 63-83058 | 5/1988 | Japan . |

*Primary Examiner*—Peter R. Brown
*Attorney, Agent, or Firm*—Foley & Lardner

[57] ABSTRACT

A rotatable seat mounted on a floor includes a seat proper, a lower base member mounted on the floor, an upper base member mounting thereon the seat proper and a retaining member for retaining the upper base member on the lower base member. The lower base member has a first annular portion. The upper base member has an annular flange portion and a second annular portion which is truncated conical in shape. The annular flange portion is rotatably put on the first annular portion such that the upper base member is rotatable relative to the lower base member. The retaining member is secured to the lower base member and has third and fourth annular portions. The third annular portion is opposed to and spaced from the first annular portion such that an annular groove for receiving therein the annular flange portion is defined therebetween. The fourth annular portion is truncated conical in shape and opposed to and spaced from the second annular portion such that a certain clearance is provided therebetween and that, when the upper base member receives a force to separate the upper base member from the lower base member, deformation of the upper base member is substantially suppressed by that the second annular portion is brought into abutment with the fourth annular portion.

3 Claims, 2 Drawing Sheets

ROTATABLE SEAT

BACKGROUND OF THE INVENTION

1. Field of the Invention

The present invention relates to a seat which is rotatable about a vertical axis thereof.

2. Description of the Prior Art

One of conventional rotatable seats is disclosed in Japanese Utility Model First Provisional Publication No. 63-83058. The rotatable seat comprises a support unit for supporting thereon a seat proper. The support unit comprises a lower base member which is secured to a floor, an upper base member which is rotatable relative to the fixed lower base member, and an annular flat retaining member for retaining the upper base member on the lower base member. The upper base member is put on the lower base member having an annular flange portion thereof slidably received in an annular groove which is defined between the annular retaining member and the lower base member. However, the rotatable seat has the following drawbacks.

When the seat proper receives force to lay the same in a certain direction, a portion of the upper base member receives force to separate the upper base member from the lower base member in an upward direction and tends to be deformed. A reinforcing member can be attached to the upper base member for preventing the deformation. However, this makes the structure of the support unit complicated and increases the production cost.

SUMMARY OF THE INVENTION

It is therefore an object of the present invention to provide a rotatable seat of which upper base member is hard to be deformed without using a reinforcing member.

According to the present invention, there is provided a rotatable seat mounted on a floor, comprising:
- a seat proper;
- a lower base member mounted on the floor, said lower base member having a first annular portion;
- an upper base member mounting thereon said seat proper, said upper base member having an annular flange portion and a second annular portion which is truncated conical in shape, said annular flange portion being rotatably put on said first annular portion of said lower base member such that said upper base member is rotatable relative to said lower base member; and
- a retaining member for retaining said upper base member on said lower base member, said retaining member being secured to said lower base member and having third and fourth annular portions, said third annular portion being opposed to and spaced from said first annular portion of said lower base member such that an annular groove for receiving therein said annular flange portion of said upper base member is defined therebetween, said fourth annular portion being truncated conical in shape and opposed to and spaced from said second annular portion of said upper base member such that a certain clearance is provided therebetween and that, when said upper base member receives a force to separate said upper base member from said lower base member, deformation of said upper base member is substantially suppressed by that said second annular portion of said upper base member is brought into abutment with said fourth annular portion of said retaining member.

DETAILED DESCRIPTION OF THE INVENTION

With reference to FIGS. 1 to 4, a rotatable seat according to the present invention will be described in the following.

Figure 1:
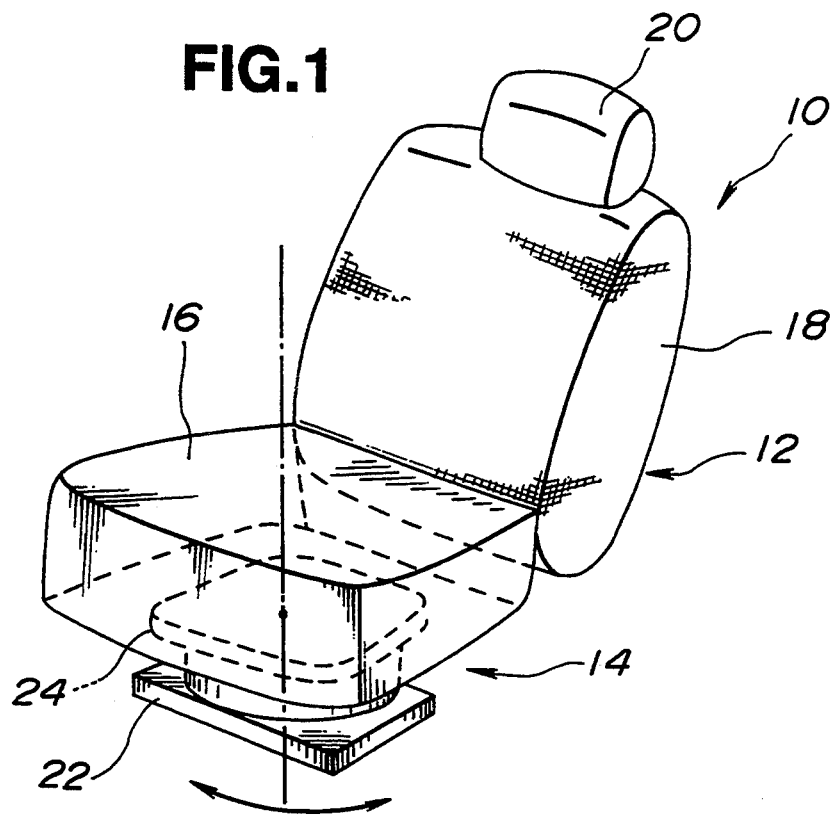
FIG. 1 is a perspective view of a rotatable seat.

As is seen from FIG. 1, the rotatable seat 10 comprises a seat proper 12 and a support unit 14 which is supported on a floor and supports thereon the seat proper 12. The seat proper 12 comprises a seat cushion part 16, a seatback part 18 and headrest part 20. The seat proper 12 has a reclining mechanism (not shown) to pivotally move the seatback part 18 relative to the seat cushion part 16.

Figure 2:
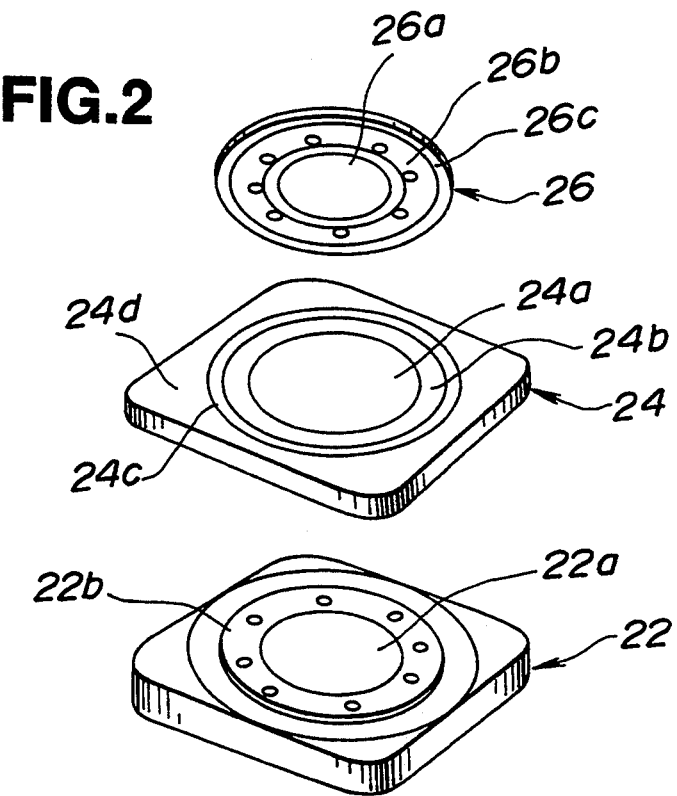
FIG. 2 is an exploded perspective view of a support unit of the rotatable seat.

As is seen from FIG. 2, the support unit 14 comprises a lower base member 22 which is secured to the floor, an upper base member 24 which is rotatable about a vertical axis thereof relative to the fixed lower base member 22, and an annular retaining member 26 for retaining the upper base member 24 on the lower base member 22.

Figure 3:
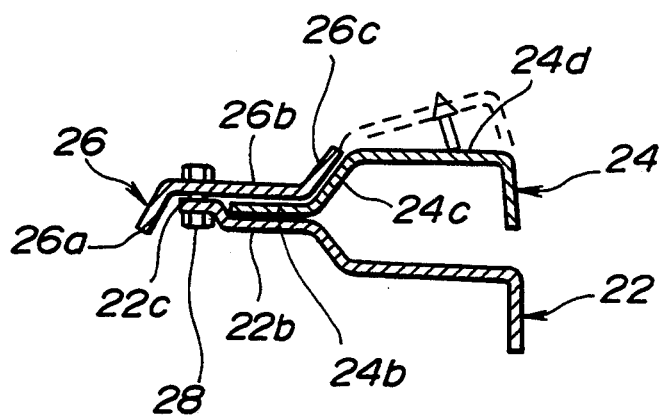
FIG. 3 is a sectional partial view of the support unit.

As is seen from FIGS. 2 and 3, the lower base member 22 is shaped rectangular and has a circular aperture 22a, a so-called annular bearing portion 22b and an annular raised portion 22c.

The annular retaining member 26 has a circular aperture 26a, a horizontal wall portion 26b and a raised wall portion 26c. The raised wall portion 26c is truncated conical in shape. The annular retaining member 26 is secured at its horizontal wall portion 26b to the raised portion 22c of the lower base member 22 through a plurality of bolts and nuts 28. An annular groove (no numeral) is provided between the horizontal wall portion 26b of the retaining member 26 and the bearing portion 22b of the lower base member 22.

The upper base member 24 has a circular aperture 24a, an annular flange portion 24b, a raised portion 24c and a horizontal wall portion 24d. The raised portion 24c is truncated conical in shape. The upper base member 24 is put on the lower base member 22 having the annular flange portion 24b slidably received in the annular groove. With this, the upper base member 24 is rotatable about a vertical axis relative to the lower base member 22. As is seen from FIG. 3, the raised portion 24c of the upper base member 24 is opposed to and spaced from the raised portion 26c of the retaining member 26 so as to have a certain desired clearance therebetween.

When the seat proper 12 receives a force to lay the same in a certain direction, a portion of the upper base member 24 receives a force to separate the upper base member 24 from the lower base member 22 in an upward direction. However, due to the provision of the raised portion 26c of the retaining member 26, the raised portion 24c of the upper base member 24 is brought into abutment with the raised portion 26c of the retaining member 26. With this, the upward movement and deformation of the upper base member 24 is substantially suppressed.

Figure 4:
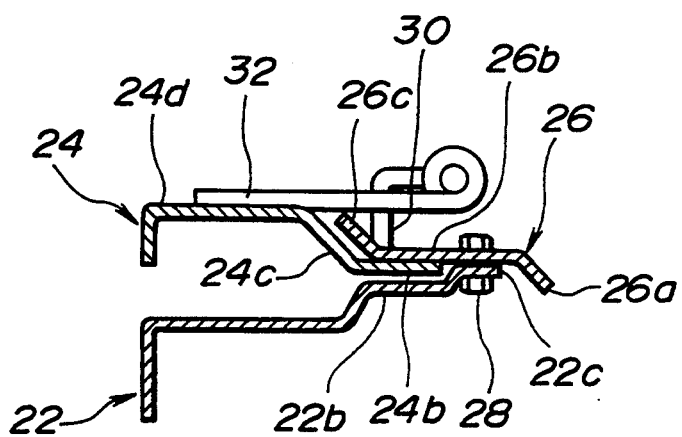
FIG. 4 is a view similar to FIG. 3, but showing a latch member together with the support unit.

As is seen from FIG. 4, the upper base member 24 has a latch member 30 for keeping the seat proper 12 at a desired angular position and a latch bracket 32 for fixing the latch member 30 on the upper base member 24. However, if desired, the latch member 30 and the latch bracket 32 may be formed on the lower base member 22.

What is claimed is:

1. A rotatable seat mounted on a floor, comprising:
a seat proper;
a lower base member mounted on the floor, said lower base member having a first annular portion;
an upper base member mounting thereon said seat proper, said upper base member having an annular flange portion and a second annular portion which is truncated conical in shape, said annular flange portion being rotatably put on said first annular portion of said lower base member such that said upper base member is rotatable relative to said lower base member; and
a retaining member for retaining said upper base member on said lower base member, said retaining member being secured to said lower base member and having third and fourth annular portions, said third annular portion being opposed to and spaced from said first annular portion of said lower base member such that an annular groove for receiving therein said annular flange portion of said upper base member is defined therebetween, said fourth annular portion being truncated conical in shape and opposed to and spaced from said second annular portion of said upper base member such that a certain clearance is provided therebetween and that, when said upper base member receives a force to separate said upper base member from said lower base member, deformation of said upper base member is substantially suppressed by that said second annular portion of said upper base member is brought into abutment with said fourth annular portion of said retaining member.

2. A rotatable seat according to claim 1, further comprising means for keeping said upper base member at a desired angular position.

3. A rotatable seat according to claim 2, wherein said means is a latch member which is secured to one of said upper base member and said lower base member.

* * * * *